3 Sheets--Sheet 1.
C. F. BOSWORTH.
Sewing-Machine.
No. 6,463. Reissued June 1, 1875.
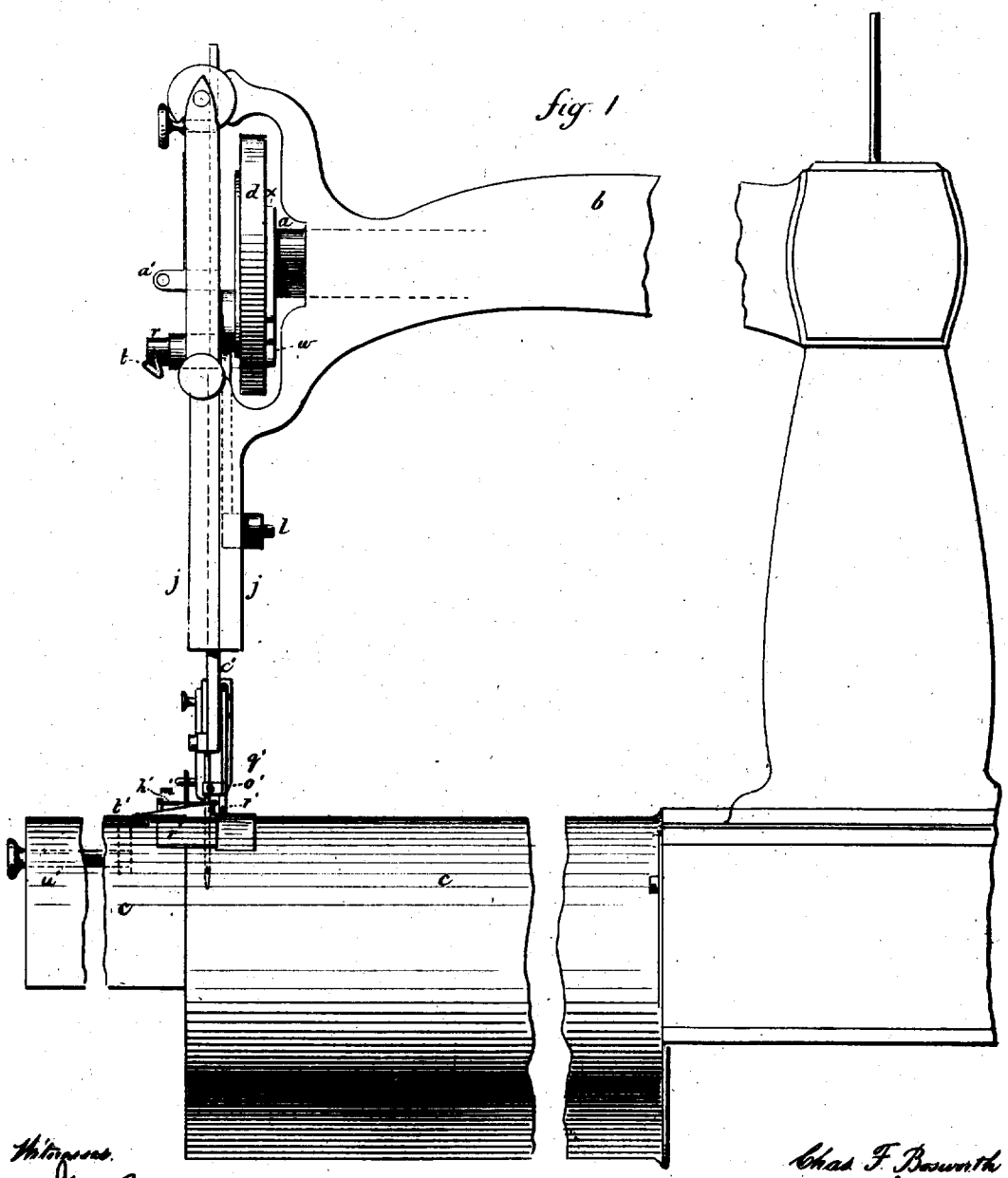
Witnesses.
H. Shumway
Clara Broughton
Chas F. Bosworth
Inventor
By Atty:
Wm P. Earle

C. F. BOSWORTH.
Sewing-Machine.
No. 6,463.
Reissued June 1, 1875.
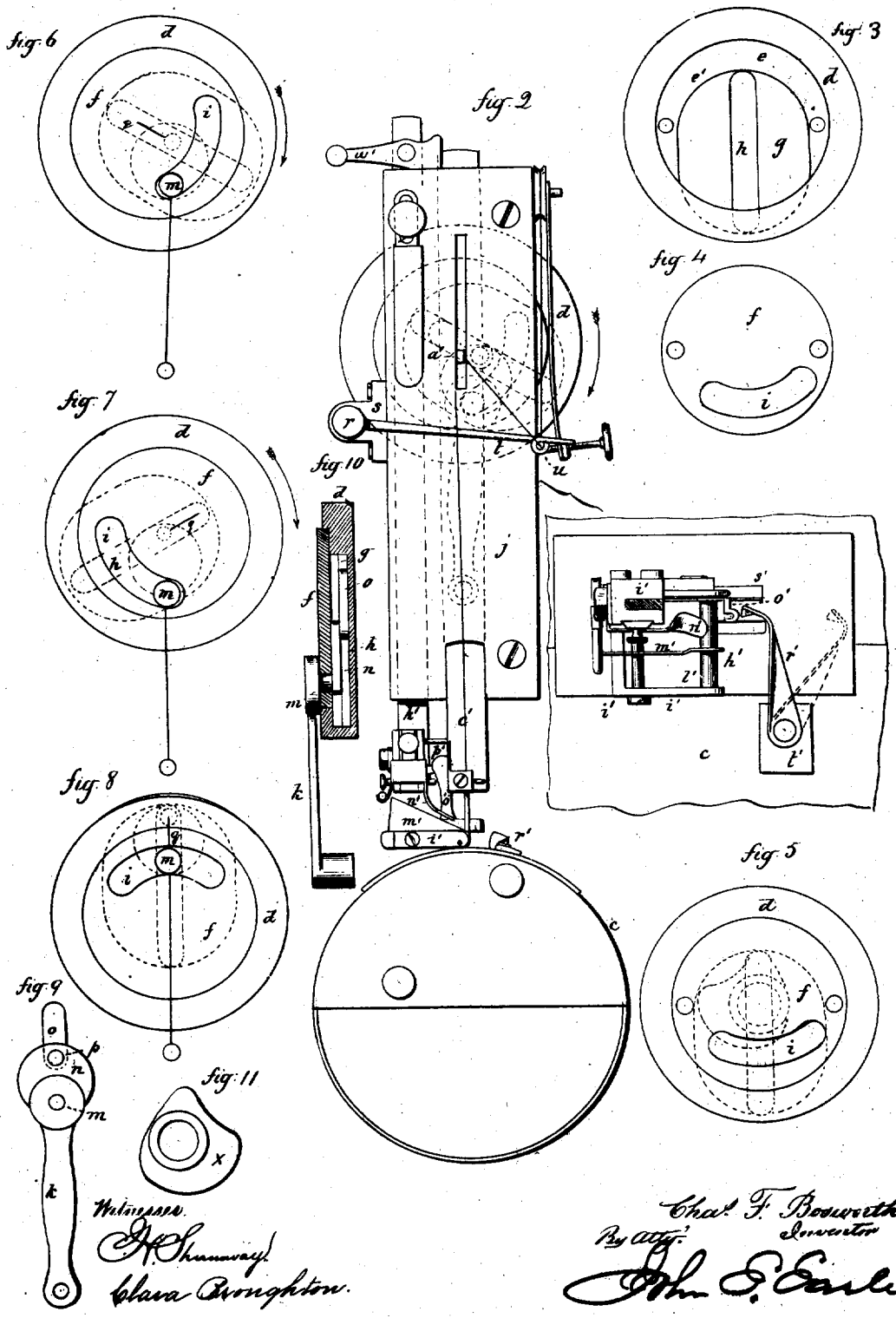
Witnesses.
H. Shumway
Clara Broughton.
Chas. F. Bosworth.
Inventor
By Atty.
John E. Earle 3 Sheets--Sheet 3.

C. F. BOSWORTH.

Sewing-Machine.

No. 6,463.

Reissued June 1, 1875.

Witnesses

H. Shumway

Clara Broughton

Chas. F. Bosworth

Inventor

By Atty.

Wm. E. Earle

UNITED STATES PATENT OFFICE.

CHARLES F. BOSWORTH, OF MILFORD, CONNECTICUT.

IMPROVEMENT IN SEWING-MACHINES.

Specification forming part of Letters Patent No. 68,835, dated September 17, 1867; reissue No. 6,463, dated June 1, 1875; application filed May 5, 1875.

*To all whom it may concern:*

Be it known that I, CHARLES F. BOSWORTH, of Milford, in the county of New Haven and State of Connecticut, have invented a new Improvement in Sewing-Machines; and I do hereby declare the following, when taken in connection with the accompanying drawings and the letters of reference marked thereon, to be a full, clear, and exact description of the same, and which said drawings constitute part of this specification, and represent in—

Figure 14:
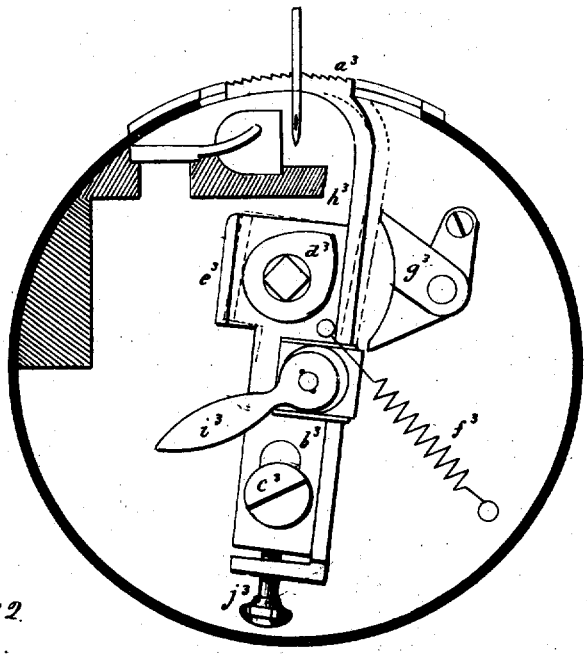
Figure 12:
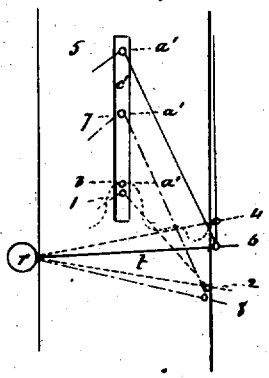
Figure 13:
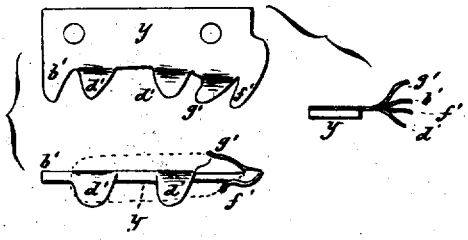

Figure 1 side view of a sewing-machine, embodying my invention, part of the arm and supporting-surface being broken away; Fig. front view; Figs. 3 to 10, inclusive, illustrate the construction and operation of the mechanism for moving the needle; Fig. 11, the cam for operating the take-up; Fig. 12, the take-up in different positions; Fig. 13, different views of the shuttle-carrier; Fig. 14, the feeding-mechanism.

This invention relates more specially to sewing-machines for sewing straw or other braids in the manufacture of hats, &c., and is an improvement on Patent No. 38,807 heretofore granted to me; but the devices herein described are applicable to that class of sewing-machines in which the needle is carried by a reciprocating needle-bar, guided in the head of the overhanging arm; and this invention consists in mechanism, substantially as hereinafter described, for imparting to the needle and needle-bar an irregular motion; also in a take-up for the needle-thread; also in an improved construction of shuttle-carrier for holding in a steady manner the shuttle; also in the combination of a mechanism for presenting a braid in a bent condition to the action of the perforating-needle with a cylindrical support for the hat being sewed, whereby the hat may be commenced at the outer edge of the brim, and when the brim is finished it may be turned to an angle of substantially ninety degrees for the continuous formation of the cylindrical portion of the crown at right angles to the brim, and when the crown is finished I form what is to serve for the top of the crown without the necessity of removing the work from the machine; also in the combination, with the cylindrical support, of the pivoted gage to guide the layers or coils of braid already sewed until within a very few coils from the center of the top of the ground, when the gage is turned away, and the final coils are laid without a guide for the edge of the sewed braid, thus finishing the hat at one operation on the same machine.

The machine, to which my improvements are shown as attached, is of the Singer class, the needle and shuttle mechanisms being operated from a main shaft, *a*, supported as usual in the overhanging arm *b*. The supporting-surface *c* for the material is shown as a cylinder, and within it is contained the shuttle and its operating mechanism and the feeding mechanism. At the end of the shaft *a* is a plate, *d*, (shown detached and in section in Figs. 3 and 10,) provided with a recess, *e*, into which is fitted a plate or disk, *f*. The recess *e* is further cut away, leaving a recess, *g*, which is provided with a groove or way, *h*. (See Fig. 3.) The plate *f* is fitted against the portion *e'*, is attached to the plate *d* by screws passing through screw-holes therein, and plate *f* is provided with a slot, *i*, eccentric to the center of the plate *f*.

When the said plate *f* is placed in the recess *e*, as seen in Figs. 5 and 10, the slot *i* crosses the groove or way *h*. The needle-bar *c'* is arranged to reciprocate in the head *j*, carries a straight perforating-needle, and is provided with a pin, *l*, connected, by means of a rod or link, *k*, with a pin, *m*, projecting from a disk-plate, *n*, pivoted to a slide-plate, *o*, the latter fitted in the groove or way *h*. The connection between the link *k* and pin *m* is such as to make the disk-plate *n* practically part of the link *k*. The pivotal pin *p*, Fig. 9, at the back of the plate *n*, and connecting it with the slide-plate *o*, is in a line with the pin *l*, forming the connecting-point for the needle-bar and link.

The movement of the needle-operating mechanism thus constructed is illustrated in diagrams, Figs. 6, 7, and 8. In Fig. 6 the needle is represented at its lowest point, the slide-plate being in position denoted by the line *q*, and the slot *h* in broken lines, and the slot *i* in solid lines, and the disk-plate *n* also in broken lines. Revolving in the direction denoted by the arrow, the slot *i* raises pin *m* slowly toward the center of plate *d* to the position denoted in Fig. 7, the slide *o* being carried over upon its pivot *p* by the groove *h*, the plate *d* thus passing through about one-third of its revolution, and raising the needle-bar only so much as the slot *i* approaches the center of motion of the plate *d*, giving sufficient time for the passage of the shuttle through the loop, the slight raising of the needle being given for the purpose of opening the loop for the ready passage of the needle therethrough. From this point—that is, as denoted in Fig. 7—the plate *d*, continuing its revolution, causes the stud *m* to be carried upward, and the movement of the slide *o* in the slot *h* when the plate *d* arrives at the point denoted in Fig. 8 has raised the needle-bar to its highest point, and in such movement the slot *i* moves the slide *o* in the slot *h*, and advances the needle-bar faster than the velocity of the plate *d*, so that the stud *m*, when in the position of Fig. 8, stands in the center of the slot *i*, thus making the movement up very quick, and the plate *d* continuing its revolution the needle-bar is in like manner quickly moved down, the stud *m* quickly descending under the joint action of the slot *i* and groove *h*, as seen in Fig. 6.

It will be observed that a stud projecting from *n*, and adapted to move in the slot *h*, would answer the same purpose as the slide *o*, yet the operation of the slide *o* turning upon the pivot *p* is much more perfect than could be attained by the stud. This construction gives to the needle a most perfect and easy movement. Starting slowly from its lowest point to rise, and rising in advance of the movement of plate *d*, as governed by the speed of the shaft *a* of the machine, it passes easily over its upper dead-center, and down to its lowest point also in advance of the movement of the shaft *a*, and resting nearly or quite stationary while the shuttle passes through the loop.

The take-up is illustrated in Figs. 1, 2, 11, and 12. Upon the shaft *r*, arranged in proper bearings *s* on one side of the head *j*, is fixed an arm, *t*, extending across the face of the head, and having in its opposite end an eye, *u*. The shaft *r* extends back, so that an arm, *w*, (see Fig. 1,) attached to the other end of the shaft *r* extends inward and bears against a cam, *x*, on the shaft *a*, the thread passing through an eye, $a^1$, on the needle-bar, as denoted in Figs. 1 and 2. The take-up operating-cam *x* is shown detached in Fig. 11, and is formed so that when the shaft *a* revolves to operate the needle, as before described, the cam *x* will give to the take-up the necessary movement to slacken or tighten the thread, as required. The take-up, acting in combination with the eye *a'* in the needle-bar, is illustrated in the diagram in Fig. 12. Starting from the same point, as described, for the movement of the needle-bar, the eye $a^1$, when the needle-bar is at its lowest point, is represented at 1, the take-up eye being at 2. The needle rises as the stud *m* passes through the slot *i*, carrying the eye $a^1$ to the position at 3, denoted in broken lines, and while the needle is moving this short distance the take-up rises to the position denoted at 4, also denoted in broken lines, in order to give sufficient thread for the free passage of the shuttle, the loose thread being denoted by broken curved lines. The needle-bar then quickly rises to its highest position, placing the eye $a^1$ at the point 5, and the take-up falls to the position denoted at 6, which draws up the thread. From this point the needle-bar, eye $a^1$, and take-up move at nearly equal velocity to the position denoted at 7 and 8, where the take-up rests until the needle-bar arrives at its lowest point 1. During this last portion of the descent of the needle-bar, the take-up rises slightly to the position denoted at 2 sufficient to insure the opening of the loop. The cam *x* operating on the arm *w* of the take-up, moves it positively and slackens the loop, and draws it taut at the proper time.

The shuttle-carrier is shown in Fig. 13, such figure showing a top view, an edge view, and an end view, looking from the rear. In this class of machines great difficulty is experienced from the inclination of the shuttle to tip up when the thread is drawn taut, and more particularly is it so when a strong tension is required, and this difficulty I overcome.

The shuttle-carrier plate *y* has its driver $b^1$ at the rear; its supporting-tongues $d^1$ $d^1$ extend from the under side of the plate and support the shuttle, and the return tongue $f^1$ is formed in the usual manner. From the plate *y* I extend over the shuttle in the rear of the point $f^1$ another tongue, $g^1$, so as to form a fulcrum, under which the shuttle bears when the thread is drawn taut, the point of the shuttle resting upon the return tongue $f^1$ as the weight, and under the tongue $g^1$ as the fulcrum, wherefore, as the weight and fulcrum are both rigid, the power or tension of the thread fails to raise the heel of the shuttle, and this difficulty of the shuttle rising is thus overcome.

The roller $h^1$, over which the braid is delivered to be sewed by the perforating-needle, is mounted in a frame, $i^1$, connected with the presser-shank *k'*. This frame has a bottom plate, $l'$, which serves as the regular presser-foot opposed to the feed; and it also has an adjustable gage, *m'*, to bear against one side of the braid being delivered about the roller $h^1$. To the side of the shank of this frame $i^1$ is secured a movable spring-foot, *n'*, adapted to bear on the braid and hold it down over the roller $h^1$. The needle-guard *o'* is pivoted to a piece, *p'*, secured to the frame $i^1$, and is pressed toward the roller $h^1$ by a spring, and the face of the guard, against which the needle touches in its descent, is inclined from the top downward toward the roller $h^1$, and insures that the needle penetrates the braid on this roller $h^1$, and, were it not for this guide, the needle would often glance from the bent rounded surface of the braid. On the cylindrical supporting-surface $c$, at its forward end, and outside the needle-hole, is pivoted a guide, $r'$, having its guiding-face substantially vertical, arranged in advance of the needle and in front of the gage-face $s'$, which governs that edge of the bent braid through which the needle passes. This guide controls the edge of the braid, which is supported on the cylindrical supporting-surface, and which is allowed to extend under the edge of the braid carried by the roller $h^1$, and this gage $r'$ is pivoted to and carried by a block, $t'$, adjustable to or from the needle by a screw, $w'$.

In forming a hat in the usual way on my machine, represented in the patent herein referred to, it is customary to lay the braid in a curved path corresponding with the shape of the outer edge of the brim, and, with a braid so laid to start a hat, the braid from a suitable supplying source is led under the foot $n'$, over the roller $h^1$, and then under it and the bottom of the frame $i$, and as the braid passes about the roller $h^1$ it is stitched to the coil or course of braid previously laid, each successive layer overlapping each preceding layer. The gage $r'$ serves to gage the braid already stitched and sustained on the supporting-surface $c$, making the braid to lap more or less, as required.

On reaching that point where it is desired to start the crown, the brim is turned up at about an angle of ninety degrees, and then the braid is laid in such manner as to form a tubular portion, or what is to serve as the side of the crown, and of greater or less length, and when it is desired to put in the top of the crown, the free end of the tubular portion of the hat is turned or pressed inward and back toward its junction with the brim, and the last row or course of the free end of the tubular part is caused to meet the support $c$, and then the braid is lapped as before, the hat being turned about in such a manner that the brim revolves in substantially a horizontal plane.

During this operation it is not necessary to remove the hat from the support $c$, and the operation of forming the top of the crown goes on until the circular opening at the center of the top of the hat will no longer contain the presser-foot. Up to this time the lapping of the braid has been uniform, and the hat is symmetrical in form, owing to the evenness of the lapping of the braid; then the gage $r'$ is turned aside, and then the feed-surface nearest the end of the cylinder is elevated by means of an eccentric lever, hereinafter described, and its stroke is shortened so as to form a bearing-point, which will permit the hat to be turned in a small curve, the feeding-surface next the upright arm of the machine at such time preferably having a greater stroke, and then the two or three small center turns of the crown are coiled and completed by irregular lapping, thus finishing the hat.

By means of the cylindrical bed I am enabled easily and quickly to form abrupt or right-angled turns at the junction of this cylindrical portion of the hat with both the brim and crown; and I am enabled to make a more perfect hat in this respect than can be made on a machine having a flat supporting-surface, as in my Patent No. 38,807; and, by the cylindrical support $c$, I am also enabled to work more rapidly, and produce hats for the public at a much less cost.

The feed is made in two parts, one only, $a^3$, being shown, the other, like it, being located just behind it. Each feed consists of a block, $b^3$, slotted to receive a fulcrum-pin, $c^3$, the lower shaft of the machine extending through the upper portion of each block. On the shaft are two cams, one, $d^3$, only being shown, and each cam strikes a projection, $e^3$, in the block, and moves each block forward against the stress of a spring, $f^3$, an adjustable feed-regulator stop, $g^3$, determining the backward movement of the feed.

The roughened surfaces $a^3$ are curved to correspond with the surface $c$. The blocks $b^3$ have a vibratory motion, and each roughened surface is formed on independent bars secured to the blocks $b^3$. The bar $h^3$, carrying $a^3$, (see Fig. 14,) is made adjustable as to its height by a lever, $i^3$, provided with an eccentric, and in this way the feed is elevated when finishing the top, to cause it to form, as it were, a small rest for the braid when the hat is to be turned in very small curves, as in finishing the tip, and at the same time this feed is shortened. The bar carrying the roughened surface, in rear of $a^3$, is adjusted by a screw, $j^3$.

These feeds are made independently adjustable, because they act on a fabric the face of which is uneven, the feed nearest the standard of frame $b$ being lowest, and the stroke varied, as desired, when sewing curves, for then one part of the fabric has to move through a greater arc than the other. The plate through which the feeding-surface operates has one side made lower than the other, so as to permit the courses of sewed braid to descend below the surface on which the braid being sewed rests, so that the fabric may be kept level, and be moved freely.

Having thus fully described my invention, what I claim is—

1. The combination of the rotating plates provided with crossing slots, substantially as described, with the needle-bar and its connecting-link, and the two bearings working in the two crossing slots, as and for the purpose set forth.

2. The combination of the thread-controlling eye, governed in its position by the needle-bar, with the take-up composed of two arms, a rock-shaft, and spring, and its actuating-cam, adapted to operate the take-up positively to slacken the thread and draw it taut, substantially as described.

3. The shuttle-carrier provided with the tongue $g^1$, arranged relatively to the return-tongue $f^1$, as described, whereby the shuttle is prevented from tilting when the thread is taken up, substantially as described.

4. The combination, with the roller for guiding and bending the braid, of the needle and the pivoted needle-guard $o'$ and its spring, substantially as described.

5. The combination of the roller over which the braid to be sewed is bent, and the gage $s'$ for governing the edge of such bent braid, with a cylindrical supporting-surface, $c$, and gage $r'$, substantially as described.

6. The combination of the roller $h^1$ and gage $s'$, for binding and gaging the strip of bent braid being overlapped and stitched on an under braid, with the cylindrical supporting-surface, the gage for the lower strip, and the divided feed having different movements, substantially as described.

7. The combination, with the supporting-surface $c$, of the adjustable gage, pivoted outside the needle-hole and beyond the head of the machine, substantially as described.

CHARLES F. BOSWORTH.

Witnesses:

JOHN E. EARLE,

G. W. GREGORY.